US010715827B2

(12) United States Patent
Hsu

(10) Patent No.: US 10,715,827 B2
(45) Date of Patent: Jul. 14, 2020

(54) MULTI-HYPOTHESES MERGE MODE

(71) Applicant: MEDIATEK INC., Hsinchu (TW)

(72) Inventor: Chih-Wei Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/863,410

(22) Filed: Jan. 5, 2018

(65) Prior Publication Data
US 2018/0199054 A1 Jul. 12, 2018

Related U.S. Application Data

(60) Provisional application No. 62/443,008, filed on Jan. 6, 2017.

(51) Int. Cl.
H04N 19/52 (2014.01)
H04N 19/176 (2014.01)
(Continued)

(52) U.S. Cl.
CPC ........... *H04N 19/52* (2014.11); *H04N 19/105* (2014.11); *H04N 19/139* (2014.11);
(Continued)

(58) Field of Classification Search
CPC .............................. H04N 19/139; H04N 19/52
(Continued)

(56) References Cited

U.S. PATENT DOCUMENTS

2013/0129242 A1* 5/2013 Lin .......................... G06T 9/004
382/233

2013/0163669 A1* 6/2013 Lim ...................... H04N 19/573
375/240.15
(Continued)

FOREIGN PATENT DOCUMENTS

CN 103548355 A 1/2014
CN 104168480 A 11/2014
(Continued)

OTHER PUBLICATIONS

State Intellectual Property Office, International Search Report and Written Opinion for PCT Application No. PCT/CN2018/071809, dated Mar. 29, 2018.

*Primary Examiner* — On S Mung
(74) *Attorney, Agent, or Firm* — Oblon, McClelland, Maier & Neustadt, L.L.P.

(57) ABSTRACT

A multi-hypotheses motion prediction mode for video coding conveys prediction for motion compensation based on a selection of multiple predictions for motion compensation (hypotheses), which are respectively obtained using motion predictors or MVP selected from a list of candidate motion predictors. When coding a block of pixels, a video coder implementing multi-hypotheses motion prediction selects a first motion predictor and a second motion predictor from a list of candidate motion predictors for the block of pixels. The video coder encodes or decodes a motion prediction code word that identifies the first and second motion predictors. The video coder computes a combined prediction for motion compensation based on first and second sets of pixels that are obtained using the selected first and second motion predictors, respectively. The video coder encodes or decodes the block of pixels by using the combined prediction for motion compensation.

18 Claims, 11 Drawing Sheets

(51) Int. Cl.
*H04N 19/182* (2014.01)
*H04N 19/46* (2014.01)
*H04N 19/139* (2014.01)
*H04N 19/577* (2014.01)
*H04N 19/105* (2014.01)

(52) U.S. Cl.
CPC ......... *H04N 19/176* (2014.11); *H04N 19/182* (2014.11); *H04N 19/46* (2014.11); *H04N 19/577* (2014.11)

(58) Field of Classification Search
USPC .................................................. 375/240.01
See application file for complete search history.

(56) References Cited

U.S. PATENT DOCUMENTS

| | | | |
|---|---|---|---|
| 2014/0086329 A1* | 3/2014 | Seregin | H04N 19/56 375/240.16 |
| 2014/0362904 A1* | 12/2014 | Lim | H04N 19/50 375/240.02 |
| 2016/0014416 A1* | 1/2016 | Hinz | H04N 19/105 375/240.13 |
| 2016/0309179 A1* | 10/2016 | Schwarz | H04N 19/50 |

FOREIGN PATENT DOCUMENTS

| | | |
|---|---|---|
| CN | 105657420 A | 6/2016 |
| WO | WO 2016072775 A1 | 5/2016 |

\* cited by examiner

| Merge_index | L0 | L1 |
|---|---|---|
| 0 | mvL0_A, ref0 | - |
| 1 | - | mvL1_B, ref0 |
| 2 | | |
| 3 | | |
| 4 | | |

→

| Merge_index | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | | |
| 4 | | |

MULTI-HYPOTHESES MERGE MODE

CROSS REFERENCE TO RELATED PATENT APPLICATION(S)

The present disclosure is part of a non-provisional application that claims the priority benefit of U.S. Provisional Patent Application No. 62/443,008, filed on Jan. 6, 2017. Contents of above-listed applications are herein incorporated by reference.

TECHNICAL FIELD

The present disclosure relates generally to video processing. In particular, the present disclosure relates to methods for transmitting motion predictors.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture, HEVC employs intra prediction and/or inter prediction modes for each PU. For intra prediction modes, the spatial neighboring reconstructed pixels can be used to generate the directional predictions in 35 directions. For inter prediction modes, the temporal reconstructed reference frames can be used to generate motion compensated predictions. There are three types of inter prediction modes: skip mode, merge mode, and advanced motion vector prediction (AMVP) mode.

Under AMVP mode, motion vectors (MVs) used for motion-compensated prediction of PUs are derived from motion vector predictors (MVPs) and motion vector differences (MVDs, or residual motion data) according to MV=MVP+MVD. For an AMVP-predicted PU, the MVP is selected from among a set of MVP candidates that includes two spatial candidates and one temporal candidate. An index that identifies the MVP selection is encoded and transmitted along with the corresponding MVD. Reference index for selecting a reference frame (or reference indices for selecting reference frames) from reference frame list L0 and/or L1 for bidirectional or unidirectional prediction is also encoded and transmitted.

When a PU is coded in either skip mode or merge mode, no motion information is transmitted except the merge index of the selected candidate. That is because skip mode and merge mode utilize motion inference methods (MV=MVP+MVD where MVD is zero) to obtain the motion information from spatially neighboring blocks (spatial candidates) or collocated blocks in temporally neighboring pictures (temporal candidates) that are selected from reference frame list L0 or L1 (indicated in slice header). In the case of a skip PU, the residual signal for the block being coded is also omitted.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide methods and systems for multi-hypotheses motion prediction or multi-hypotheses skip/merge mode. Multi-hypotheses motion prediction conveys prediction for motion compensation based on a selection of multiple predictions for motion compensation (hypotheses), which are respectively obtained using motion predictors or MVP selected from a list of candidate motion predictors. When coding a block of pixels, a video coder (encoder or decoder) implementing multi-hypotheses motion prediction selects a first motion predictor and a second motion predictor from a list of candidate motion predictors for the block of pixels. The video coder encodes or decodes a motion prediction code word that identifies the first and second motion predictors. The video coder computes a combined prediction for motion compensation (also referred to as a combined motion compensated predictor) based on first and second sets of pixels that are obtained using the selected first and second motion predictors, respectively. The video coder encodes or decodes the block of pixels by using the combined prediction for motion compensation.

In some embodiments, the code word comprises a particular index that identifies the first motion predictor. The second motion predictor is identified according to a mapping of the particular index. In some embodiments, only one index is used and encoded as in the original merge mode to select the first candidate, while the second candidate is selected by using a predetermined way, such as applying a fixed offset to the index. In some embodiments, the code word for identifying the first and second motion predictors includes an index that identifies the first motion predictor, while the second motion predictor is identified according to a predetermined searching process. In some embodiments, when a video encoder or decoder receives a selection of multiple hypotheses of motion predictors, simple average or weighted sum of the prediction pixels of the first and second motion predictors (i.e., the sets of pixels referenced or obtained by the first and second motion predictors) are used to generate a combined prediction for compensation (or combined motion compensated predictor) as the final prediction for motion compensation. In some embodiments, the average is a weighted average in which the two hypotheses are weighted differently.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Candidates List

To transmit motion information for a pixel block under HEVC by using AMVP, merge mode, or skip mode, an index is used to select a MVP (or motion predictor) from a list of candidate motion predictors. In merge/skip mode, a merge index is used to select a MVP from a list of candidate motion predictors that includes four spatial candidates and one temporal candidate. The merge index is transmitted, but motion predictors are not transmitted.

Figure 1:
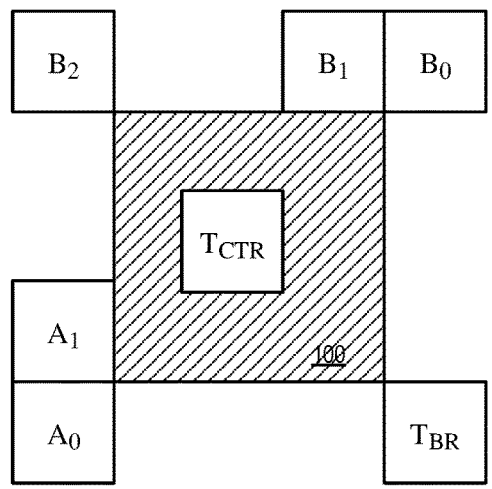
FIG. 1 shows the MVP candidates set for merge/skip/AMVP modes in HEVC.

FIG. 1 shows the MVP candidates set for merge/skip/AMVP modes in HEVC. The figure shows a current block 100 (CU or PU) of a video picture or frame being encoded or decoded. The current block 100 (which can be a PU or a CU) refers to neighboring PUs to derive the spatial and temporal MVPs for AMVP, merge mode or skip mode.

For AMVP, the left MVP is the first available one from $A_0$, $A_1$ the top MVP is the first available one from $B_0$, $B_1$, $B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not a scaled MVP, the second top MVP can be derived if there is a scaled MVP among $B_0$, $B_1$, and $B_2$. The list size of MVPs of AMVP is two in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

For skip mode and merge mode, up to four spatial merge indices are derived from $A_0$, $A_1$, $B_0$ and $B_1$, and one temporal merge index is derived from $T_{BR}$ or $T_{CTR}$ ($T_{BR}$ is used first, if $T_{BR}$ is not available, $T_{CTR}$ is used instead). If any of the four spatial merge index is not available, the position $B_2$ is used to derive merge index as a replacement. After the deriving four spatial merge indices and one temporal merge index, redundant merge indices are removed. If the number of non-redundant merge indices is less than five, additional candidates may be derived from original candidates and added to the candidates list. There are three types of derived candidates:

1. Combined bi-predictive merge candidate (derived candidate type 1)
2. Scaled bi-predictive merge candidate (derived candidate type 2)
3. Zero vector merge/AMVP candidate (derived candidate type 3)

Figure 2:
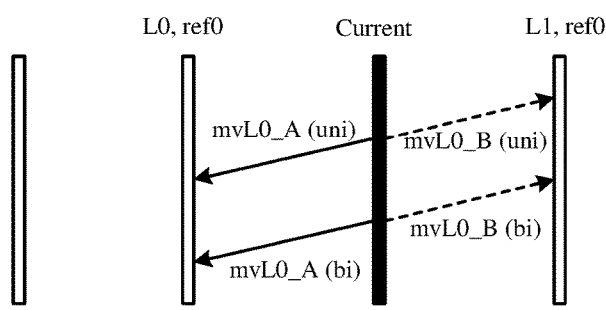
FIG. 2 illustrates a merge candidates list that includes combined bi-predictive merge candidates.

For derived candidate type 1, combined bi-predictive merge candidates are created by combining original merge candidates. Specifically, if the current slice is a B slice, a further merge candidate can be generated by combining candidates from List 0 and List 1. FIG. 2 illustrates a merge candidates list that includes combined bi-predictive merge candidates. As illustrated, two original candidates having mvL0 (the motion vector in list 0) and refIdxL0 (the reference picture index in list 0) or mvL1 (the motion vector in list 1) and refIdxL1 (the reference picture index in list 1), are used to create bi-predictive Merge candidates.

Figures 3, 4:
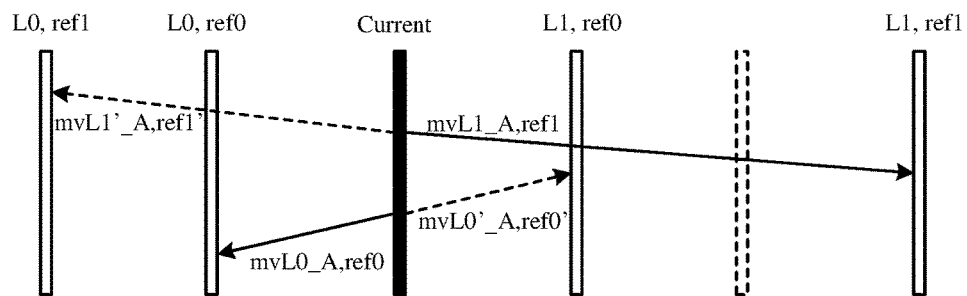
FIG. 3 illustrates a merge candidates list that includes scaled merge candidates.
FIG. 4 illustrates an example in which zero vector candidates are added to a merge candidates list or an AMVP candidates list.

For derived candidate type 2, scaled merge candidates are created by scaling original merge candidates. FIG. 3 illustrates a merge candidates list that includes scaled merge candidates. As illustrated, an original merge candidate has mvLX (the motion vector in list X, X can be 0 or 1) and refIdxLX (the reference picture index in list X, X can be 0 or 1). For example, an original candidate A is a list 0 uni-predicted MV with mvL0_A and reference picture index ref0. Candidate A is initially copied to list L1 as having reference picture index ref0'. The scaled MV mvL0'_A is calculated by scaling mvL0_A based on ref0 and ref0'. A scaled bi-predictive Merge candidate having mvL0_A and ref0 in list L0 and mvL0'_A and ref0' in list L1 is created and added to the merge candidates list. Likewise, a scaled bi-predictive merge candidate which has mvL1'_A and ref1' in List 0 and mvL1_A, ref1 in List 1 is created and added to the merge candidates list.

For derived candidate type 3, zero vector candidates are created by combining zero vectors and reference indices. If a created zero vector candidate is not a duplicate, it is added to the merge/AMVP candidates list. FIG. 4 illustrates an example in which zero vector candidates are added to a merge candidates list or an AMVP candidates list.

II. Multi-Hypothesis Motion Prediction

In skip/merge mode, one merge index is used to select one motion predictor candidate from a list of candidates, which may include uni-prediction or bi-prediction motion predictors. The list of candidates may also include derived candidates that are derived from other candidates such as combined bi-predictive merge candidates, scaled bi-predictive merge candidates, and zero vector merge candidates as described above in Section I.

A motion predictor or MVP selected from the list of candidate motion predictors is used to obtain a set of pixels that are referenced by the selected motion predictor. This set of pixels is then used as prediction pixels for motion compensation. The prediction pixels can therefore be referred to as prediction for motion compensation, a motion compensated predictor, or a hypothesis. A skip/merge mode scheme in which one merge index is used to convey one selected motion predictor is therefore a single-hypothesis merge mode.

Some embodiments of the disclosure provide methods and systems for multi-hypotheses motion prediction or multi-hypotheses skip/merge mode. Multi-hypotheses motion prediction conveys prediction for motion compensation based on a selection of multiple predictions for motion compensation (hypotheses), which are respectively obtained using motion predictors or MVP selected from a list of candidate motion predictors. When coding a block of pixels, a video coder (encoder or decoder) implementing multi-hypotheses motion prediction selects a first motion predictor and a second motion predictor from a list of candidate motion predictors for the block of pixels. The video coder encodes or decodes a motion prediction code word that identifies the first and second motion predictors. The video coder computes a combined prediction for motion compensation (also referred to as a combined motion compensated predictor) based on first and second sets of pixels that are obtained using the selected first and second motion predictors, respectively. The video coder encodes or decodes the block of pixels by using the combined prediction for motion compensation. An exemplary video encoder implementing multi-hypotheses motion prediction is described in Section III below. An exemplary video decoder implementing multi-hypotheses motion prediction is described in Section IV below.

In some embodiments, the selection of two or more motion predictors is conveyed by a motion prediction code word in the bitstream. The motion prediction code word may include a first index identifying the first motion predictor and a second index identifying the second motion predictor from the list of candidate motion predictors. The second index may be coded as a difference from the first index in the code word. Generally, the second index can be explicitly signaled or implicitly derived by coding parameters in addition to the first index (i.e., the original merge index).

In some embodiments, one index mapping is used to indicate both one-hypothesis and two-hypothesis selections. In other words, the code word for identifying the selection of candidate motion predictors has an index that identifies (i) any one candidate motion predictors selected from the list of candidate motion predictors or (ii) any combination of any two candidate motion predictors selected from the list of candidate motion predictors.

Figure 5:
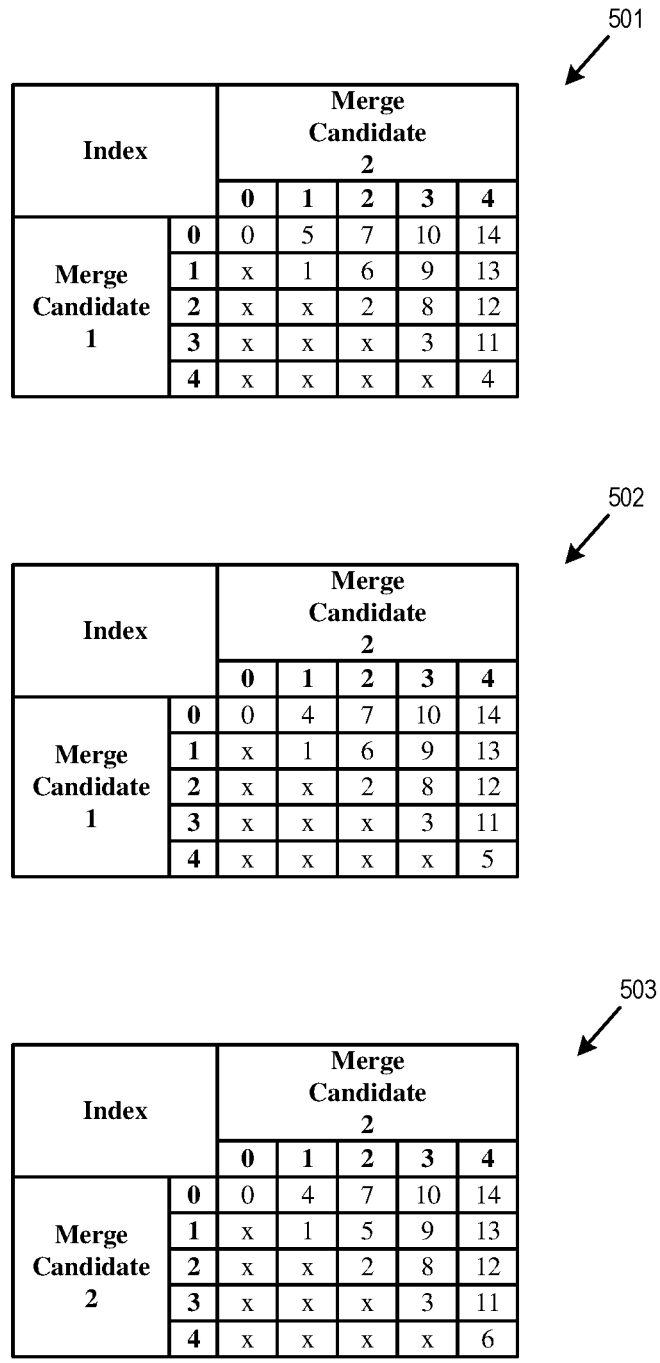
FIG. 5 illustrates using one index in the code word to signal one hypothesis or two hypotheses.

FIG. 5 illustrates using one index in the code word to signal one hypothesis or two hypotheses. The figure illustrates three exemplary mappings 501-503 of one index into one hypothesis or two hypotheses. In the example, one index is used to select one (one hypothesis) or two (two hypotheses) candidates from the five candidates of the HEVC merge mode list of candidates.

If there are N candidates in the candidates list, the index mapping can contain N+N(N−1)/2 entries, where first N entries contain indices for one candidate only and another N(N−1)/2 entries contain indices for arbitrary two-combinations of the N candidates. The order of the indices can be arranged in a predetermined way, for example, according to statistics for some test sequences.

For example, in the mapping 501, indices 0-4 are used to signal one hypothesis and indices 5-14 are used to signal two hypotheses. Indices 0-4 map to candidates 0, 1, 2, 3, or 4, respectively. Index 5 maps to candidates 0 and 1, index 6 maps to candidates 1 and 2, index 7 maps to candidates 0 and 2, index 8 maps to candidates 2 and 3, index 9 maps to candidates 1 and 3, index 10 maps to candidates 0 and 3, index 11 maps to candidates 2 and 4, index 12 maps to candidates 2 and 4, index 13 maps to candidates 1 and 4, and index 14 maps to candidates 0 and 4. The mappings 502 and 503 map some of the indices to different candidates in the candidates list (e.g., in the mapping 502, the index 4 maps to candidates 0 and 1 instead of candidate 4).

In some embodiments, the code word comprises a particular index that identifies the first motion predictor. The second motion predictor is identified according to a mapping of the particular index. In some embodiments, only one index is used and encoded as in the original merge mode to select the first candidate, while the second candidate is selected by using a predetermined way, such as applying a fixed offset to the index. The fixed offset can be +1 such that the video encoder or decoder always chooses two consecutive candidates from the list for multi-hypotheses motion prediction.

In some embodiments, the code word identifying the first and second motion predictors includes an index that identifies the first motion predictor, while the second motion predictor is identified according to a predetermined searching process. In some embodiments, the first motion predictor candidate is selected using rate-distortion optimization, i.e. considering both the prediction distortion and coded bitrate to decide the best candidate. The first selected candidate (e.g., the first motion predictor) is therefore the most cost-effective candidate from the list of candidates. In order to select the second selected candidate (e.g., the second motion predictor), a search of the candidates list is performed to identify a candidate with a smallest difference with the first selected candidate as the second selected candidate. In some embodiments, the difference between the first and second candidates is defined as the sum of squared differences (SSD) or sum of absolute differences (SAD) between a first set of pixels referenced or obtained by the first motion predictor candidate and a second set of pixels referenced or obtained by the second motion predictor candidate. In some embodiments, the set of pixels referenced or obtained by a motion predictor is defined by a predetermined template, which may define a block of pixels, a set of border pixels, or any other collection of pixels that are referenced or targeted by the motion predictor.

In some embodiments, when a video encoder or decoder receives a selection of multiple motion predictors, simple average or weighted sum of the prediction pixels of the multiple motion predictors (i.e., the multiple sets of pixels referenced or obtained by the multiple motion predictors) are used to generate a combined prediction for compensation (or combined motion compensated predictor) as the final prediction for motion compensation. In some embodiments, the average is a weighted average in which the two hypotheses are weighted differently. For example, the set of pixels obtained by the first selected candidate (the first hypothesis) may be assigned more weight than the set of pixels obtained by the second selected candidate (the second hypothesis). If the first and second selected candidates are derived from spatial neighboring blocks (e.g., $A_0$ and $A_1$ blocks) of the current block (e.g., 100), the weightings are assigned according to the respective pixel distances between the spatial neighboring blocks and the current block, higher weightings given to the candidate with the smaller distance. In still another example, the weightings assigned to each hypothesis is determined based on the SAD/SSD between the set of pixels referenced or obtained by the hypothesis's motion predictor and the content of the current block being coded, with higher weighting given to the candidate with the smaller SAD/SSD.

In some embodiments, the two hypotheses can be applied to two different spatial regions within a block. For example, if the first hypothesis is a candidate derived from the left neighboring block (e.g., $A_1$) and the second hypothesis is derived from the upper-right neighboring block (e.g., $B_0$), the to-be-predicted block can be divided into two regions, (the two regions may or may not have equal area). The left region is predicted using the first hypothesis (from left neighboring block $A_1$) and the right region is predicted using the second hypothesis (from upper-right neighboring block $B_0$). If there is an overlap between the two regions, a combined prediction for motion compensation for the overlap region can be calculated by a weighted average of the sets of the pixels obtained using the two selected candidate motion predictors.

In some embodiments, only a subset of the candidates list is used for multi-hypotheses motion prediction. For example, an encoder may select from only uni-prediction candidates in the candidates list for multi-hypotheses motion prediction while bi-prediction candidates are not used.

Figure 6:
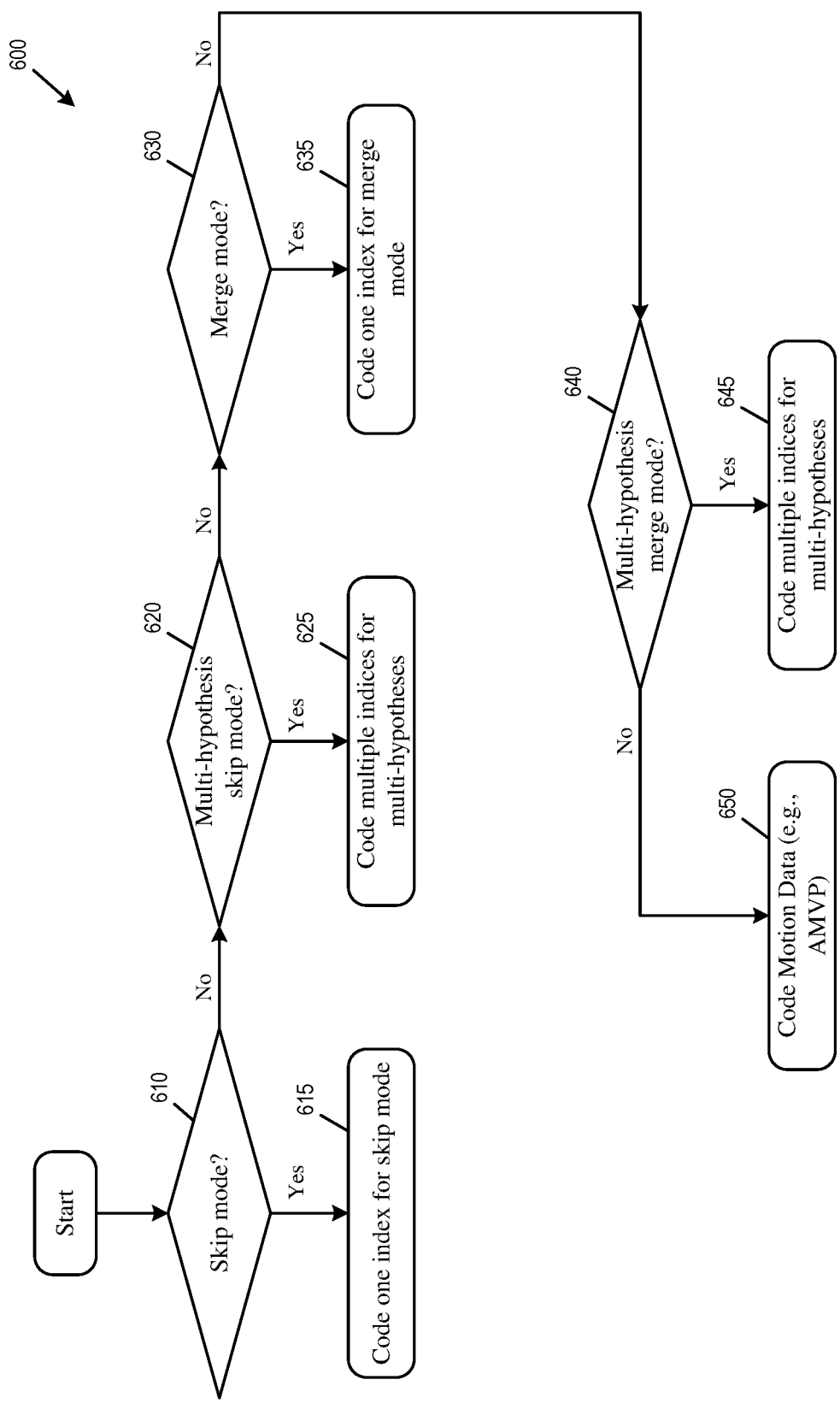
FIG. 6 conceptually illustrates an example process for coding a motion prediction code word for a block of pixels.

FIG. 6 conceptually illustrates an example process 600 for coding (encoding or decoding) a motion prediction code word for a block of pixels (CU or PU). The code word indicates or conveys whether the block is encoded by one hypothesis skip/merge mode, multi-hypotheses skip/merge mode, or AMVP (with residual motion data). In some embodiments, the process 600 describes an exemplary syntax of a bitstream that encodes the block of pixels by using multi-hypotheses skip/merge mode.

In some embodiments, a video encoder (e.g., video encoder 700 described in Section III below) performs the process 600 when encoding the current block of pixels into the bitstream according to a mode selection decision that decides whether the block of pixels is to be encoded by skip mode, merge mode, or AMVP. This decision can be made by a rate/distortion control process of the video encoder based on whether the block of pixels can be suitably coded without residual motion data (MVD) and/or without residual signal. In some embodiments, a video decoder (e.g., video decoder 1000 described in Section IV below) performs the process 600 when decoding the current block of pixels according to the content of the bitstream (e.g., when decoding the motion prediction code word encoded in the bitstream). In some embodiments, one or more processing units (e.g., a processor) of a computing device implementing the video encoder or decoder performs the process 600 by executing instructions stored in a computer readable medium.

The process 600 starts when the video encoder or decoder receives a block of pixels that is coded by using inter-prediction. The video encoder or decoder determines (at 610) whether the block is coded in single-hypothesis skip mode. If the block is coded with single-hypothesis skip mode, the video coder codes (at step 615) one merge index for selecting one motion predictor for single-hypothesis skip mode (encode into the motion prediction code word or decode from the motion prediction code word.) If the block is not coded in single-hypothesis skip mode, the process proceeds to 620.

At step 620, the video encoder or decoder determines whether the block is coded in multi-hypotheses skip mode. If the block is coded with multi-hypothesis skip mode, the video encoder or decoder codes (at step 625) multiple indices for selecting multiple motion predictors for multi-hypotheses skip mode (encode into the motion prediction code word or decode from the motion prediction code word.) If the block is not coded in single-hypothesis or multi-hypotheses skip mode, the process proceeds to 630.

At step 630, the video encoder or decoder determines whether the block is coded in single-hypothesis merge mode. If the block is coded with single-hypothesis merge mode, the video coder codes (at step 635) one merge index for selecting one motion predictor for single-hypothesis merge mode (encode into the motion prediction code word or decode from the motion prediction code word.) If the block is not coded in single-hypothesis merge mode, the process proceeds to 640.

At step 640, the video encoder or decoder determines whether the block is coded in multi-hypotheses merge mode. If the block is coded with multi-hypothesis merge mode, the video encoder or decoder codes (at step 645) multiple indices for selecting multiple motion predictors for multi-hypotheses merge mode (encode into the motion prediction code word or decode from the motion prediction code word.) If the block is not coded in single-hypothesis or multi-hypotheses merge mode, the process proceeds to 650.

At step 650, the video coder process residual motion data or motion information. At this step of the process 600, the video coder has determined that the block is coded in neither skip mode nor merge mode and may have residual motion data (e.g., MVD). The video coder then proceeds to process the block in another inter-prediction mode (e.g., AMVP) by encoding the residual motion data into the bitstream or retrieving the residual motion data from the bitstream. The process 650 then ends.

III. Multi-Hypotheses Video Encoder

Some embodiments of the disclosure provide a video encoder that implements multi-hypotheses motion prediction (skip/merge mode), which allows the encoder to convey motion prediction based on a selection of multiple motion predictors from a list of candidate motion predictors. The video encoder selects a first motion predictor and a second motion from a list of candidate motion predictors. The video encoder computes a combined prediction based on first and second sets of pixels that are obtained using the first and second motion predictors, respectively. The video encoder encodes the block of pixels by using the combined prediction for motion compensation. The video encoder stores the motion prediction code word and the encoded block of pixels in a bitstream.

Figure 7:
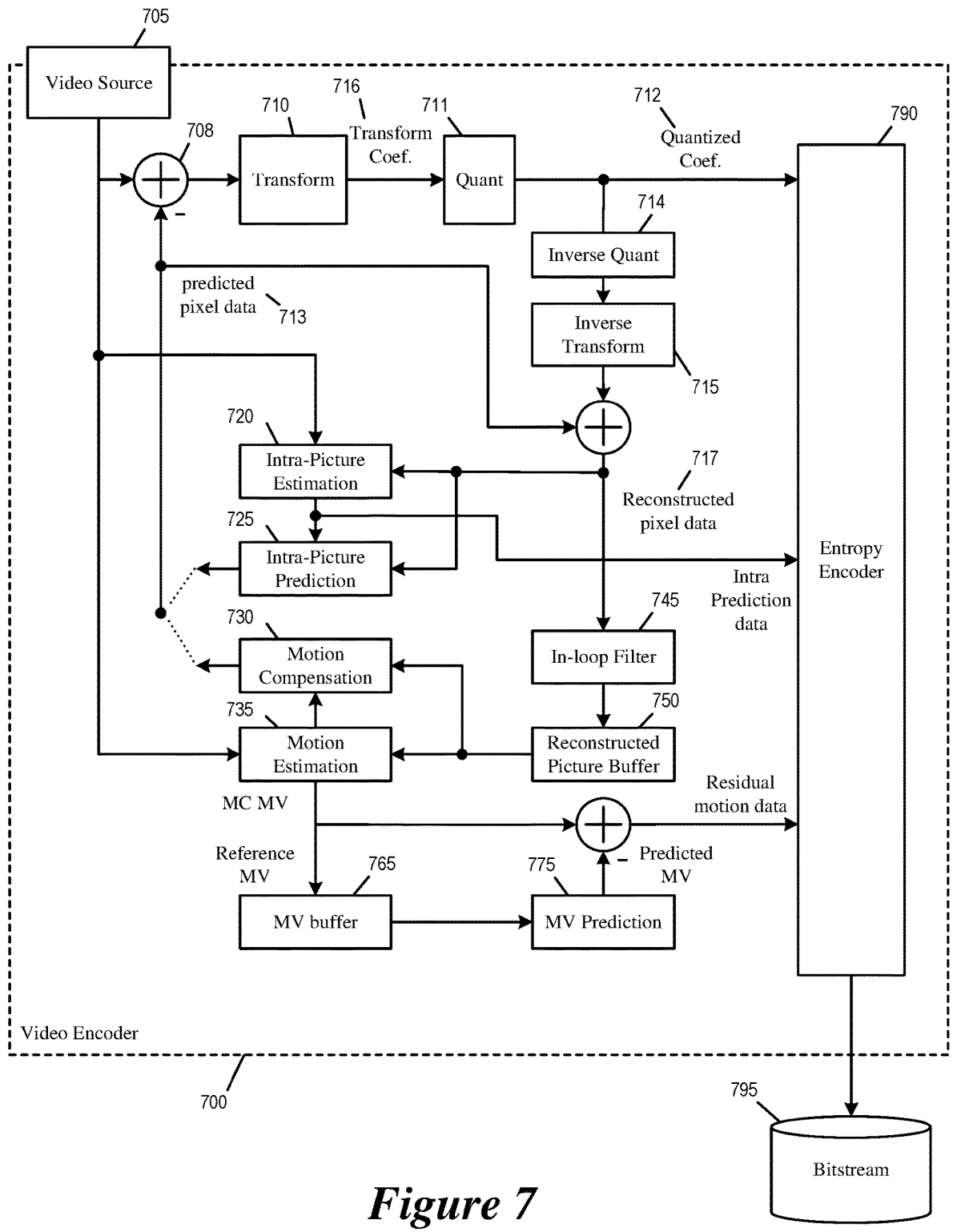
FIG. 7 illustrates an example video encoder that implements multi-hypotheses motion prediction.

FIG. 7 illustrates an example video encoder 700 that implements multi-hypotheses motion prediction. As illustrated, the video encoder 700 receives input video signal from a video source 705 and encodes the signal into bitstream 795. The video encoder 700 has several components or modules for encoding the video signal 705, including a transform module 710, a quantization module 711, an inverse quantization module 714, an inverse transform module 715, an intra-picture estimation module 720, an intra-picture prediction module 725, a motion compensation module 730, a motion estimation module 735, an in-loop filter 745, a reconstructed picture buffer 750, a MV buffer 765, and a MV prediction module 775, and an entropy encoder 790.

In some embodiments, the modules 710-790 are modules of software instructions being executed by one or more processing units (e.g., a processor) of a computing device or electronic apparatus. In some embodiments, the modules 710-790 are modules of hardware circuits implemented by one or more integrated circuits (ICs) of an electronic apparatus. Though the modules 710-790 are illustrated as being separate modules, some of the modules can be combined into a single module.

The video source 705 provides a raw video signal that presents pixel data of each video frame without compression. A subtractor 708 computes the difference between the raw video pixel data of the video source 705 and the predicted pixel data 713 from motion compensation 730 or intra-picture prediction 725. The transform 710 converts the difference (or the residual pixel data) into transform coefficients (e.g., by performing Discrete Cosine Transform, or DCT). The quantizer 711 quantized the transform coefficients into quantized data (or quantized coefficients) 712, which is encoded into the bitstream 795 by the entropy encoder 790.

The inverse quantization module 714 de-quantizes the quantized data (or quantized coefficients) 712 to obtain transform coefficients, and the inverse transform module 715 performs inverse transform on the transform coefficients to produce reconstructed pixel data 717 (after adding prediction pixel data 713). In some embodiments, the reconstructed pixel data 717 is temporarily stored in a line buffer (not illustrated) for intra-picture prediction and spatial MV prediction. The reconstructed pixels are filtered by the in-loop filter 745 and stored in the reconstructed picture buffer 750. In some embodiments, the reconstructed picture buffer 750 is a storage external to the video encoder 700. In some embodiments, the reconstructed picture buffer 750 is a storage internal to the video encoder 700.

The intra-picture estimation module 720 performs intra-prediction based on the reconstructed pixel data 717 to produce intra prediction data. The intra-prediction data is provided to the entropy encoder 790 to be encoded into bitstream 795. The intra-prediction data is also used by the intra-picture prediction module 725 to produce the predicted pixel data 713.

The motion estimation module 735 performs inter-prediction by producing MVs to reference pixel data of previously decoded frames stored in the reconstructed picture buffer 750. These MVs are provided to the motion compensation module 730 to produce predicted pixel data. The motion compensation module 730 will be further described by reference to FIG. 8 below with regard to multi-hypotheses motion prediction. Instead of encoding the complete actual MVs in the bitstream, the video encoder 700 uses MV prediction to generate predicted MVs, and the difference between the MVs used for motion compensation and the predicted MVs is encoded as residual motion data and stored in the bitstream 795.

The MV prediction module 775 generates the predicted MVs based on reference MVs that were generated for encoding previously video frames, i.e., the motion compensation MVs that were used to perform motion compensation. The MV prediction module 775 retrieves reference MVs from previous video frames from the MV buffer 765. The video encoder 700 stores the MVs generated for the current video frame in the MV buffer 765 as reference MVs for generating predicted MVs.

The MV prediction module 775 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 795 by the entropy encoder 790.

The entropy encoder 790 encodes various parameters and data into the bitstream 795 by using entropy-coding techniques such as context-adaptive binary arithmetic coding (CABAC) or Huffman encoding. The entropy encoder 790 encodes parameters such as quantized transform data and residual motion data into the bitstream.

The in-loop filter 745 performs filtering or smoothing operations on the reconstructed pixel data 717 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 8:
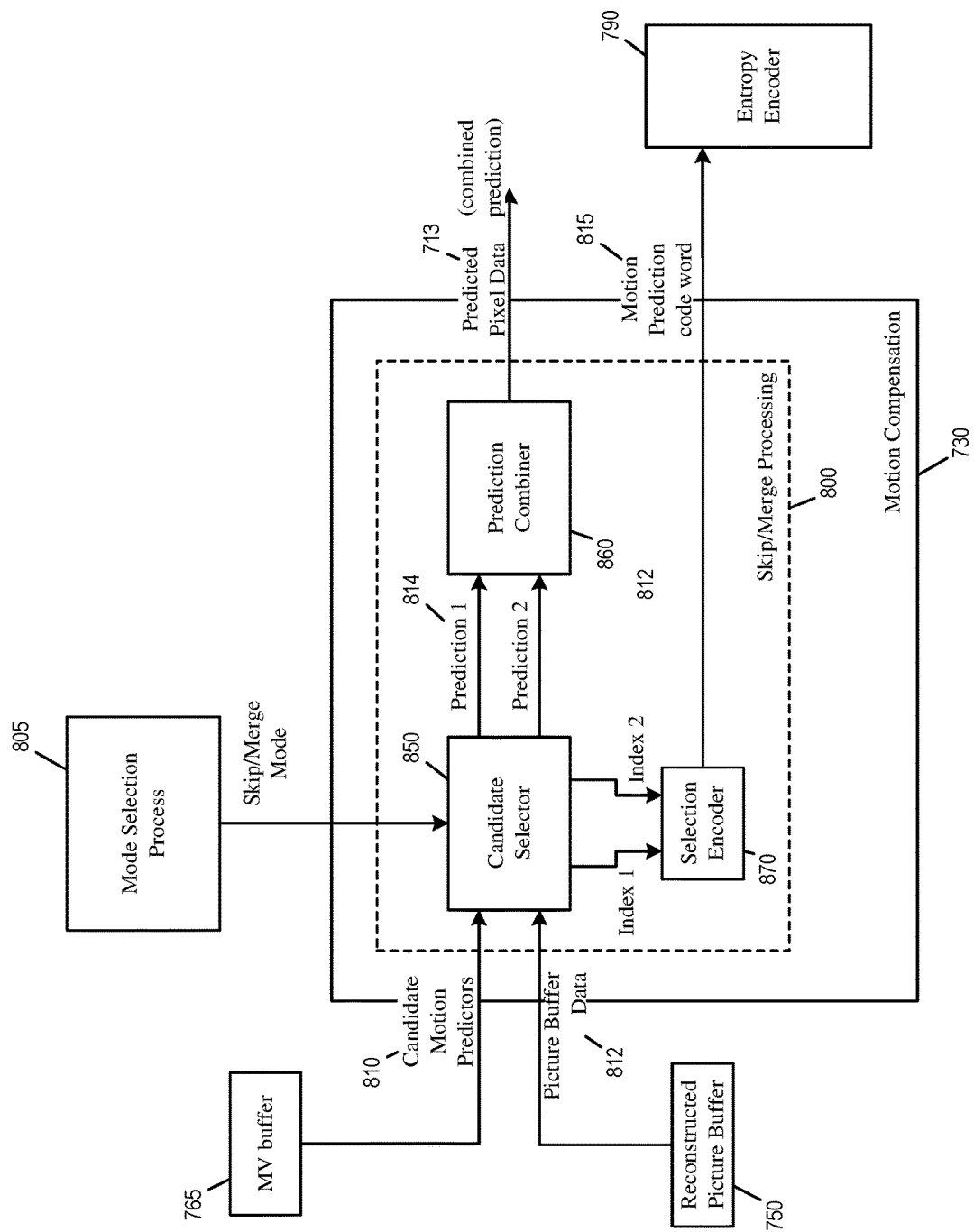
FIG. 8 illustrates a motion compensation module implementing multi-hypotheses motion prediction in the video encoder.

FIG. 8 illustrates the motion compensation module 730 implementing multi-hypotheses motion prediction in the video encoder 700. As illustrated, the motion compensation module 730 receives previously stored motion vectors from the MV buffer 765 as candidate motion predictors 810. The motion compensation module 730 also picture buffer data 812 from the reconstructed picture buffer 750, which provides sets of pixels referenced by motion the motion predictors. The motion compensation module in turn produces the predicted pixel data 713 and motion prediction code word 815. The entropy encoder 790 encodes the code word 815 into the bitstream 795.

The motion compensation module 730 includes a candidate selector module 850, a prediction combiner module 860, and a selection encoder module 870.

The candidate selector module 850 receives the candidate motion predictors 810 (i.e., the stored motion vectors retrieved from the MV buffer 765) and generates a selection for one or more motion candidates. The selected candidate motion predictors are used to obtain predictions 814 for motion compensation: prediction 1 corresponds to a first set of pixels that are obtained using the first selected motion predictor and prediction 2 corresponds to a second set of pixels that are obtained using the second selected motion predictor. The predictions 814 for motion compensation are forwarded to the prediction combiner 860, which combines the obtained predictions 814 into a combined prediction for motion compensation, which is used as the predicted pixel data 713. The identities (e.g., merge indices) of the selected motion candidates are forwarded to the selection encoder module 870, which generates the motion prediction code word 815 that identifies the selected motion candidates.

The candidate selector module 850 determines which stored motion vectors shall be included in the list of motion candidates and assigns an index to each motion predictor in the list of candidates based on the video coding standard (e.g., HEVC). In some embodiments, the candidate selector 850 identifies a subset of the candidates in the list of candidates (e.g., only uni-prediction) and confines its selection of candidates to only from those in the subset.

The candidate selector module 850 may select one or two candidate motion predictors from the set of candidates 810 based on a mode selection process 805. The mode selection process may be part of a rate/distortion control process of the video encoder 700 based on whether the block of pixels can be suitably coded without residual motion data (MVD) and/or without residual signal.

In some embodiments, the candidate selector module 850 makes its selection based on picture buffer data 812. The picture buffer data 812 provides additional information for the candidate motion predictors 810. For each of candidate motion predictors 810, the picture buffer data 812 provide information that allows the candidate selector 850 to determine: the spatial location of the neighboring block from which the candidate motion predictor is adopted; the pixels targeted or referenced by the candidate motion predictor (e.g., according to the predetermined template); the motion vector type (e.g., bi-prediction, uni-prediction); and other types of information. Based on this information, the candidate selector 850 selects the first candidate and optionally the second candidate from the list of motion candidates. The candidate selector 850 may select the second candidate based on index offset from the first selected candidate. The candidate selector 850 may also select the second candidate by searching the list based on the picture buffer data 812. The selection of the first and second motion candidates is described in Section II above.

The prediction combiner module 860 combines the two predictions 814 (which are pixel data obtained based on the two selected motion predictors) into the combined prediction 713. The combination may be simple average or weighted sum of predictions 814. The prediction combiner 860 may also use information derived from picture buffer data 812 to assign a weight to each of the predictions 814. The assignment of weight to each prediction when computing the combined prediction 713 for motion compensation is described in Section II.

In some embodiments, the two predictions 814 (predictions 1 and 2) are applied separately to different first and second spatial regions within the current block. In such instances, the prediction combiner module 860 would apply the first prediction (prediction 1 derived from the first selected motion predictor) when the first region of the current block is being encoded and apply the second prediction (prediction 2 derived from the second selected motion predictor) when the second region of the current block is being encoded. If the two regions overlap, the prediction combiner 860 calculates a combined prediction as a weighted average of the two predictions 814. The weight assigned to each prediction is based on information derived from picture buffer data 812, e.g., pixel distances between the current block and the spatial neighboring blocks of the two selected motion candidates.

The selection encoder module 870 generates the motion prediction code word 815 that identifies the selected motion candidate(s) based on index or indices provided by the candidate selector 850. The encoding of the code word 815 is described in Section II above. An exemplary encoding scheme for the code word 815 to identify one or two motion candidates is described by reference to FIG. 5 above.

Figure 9:
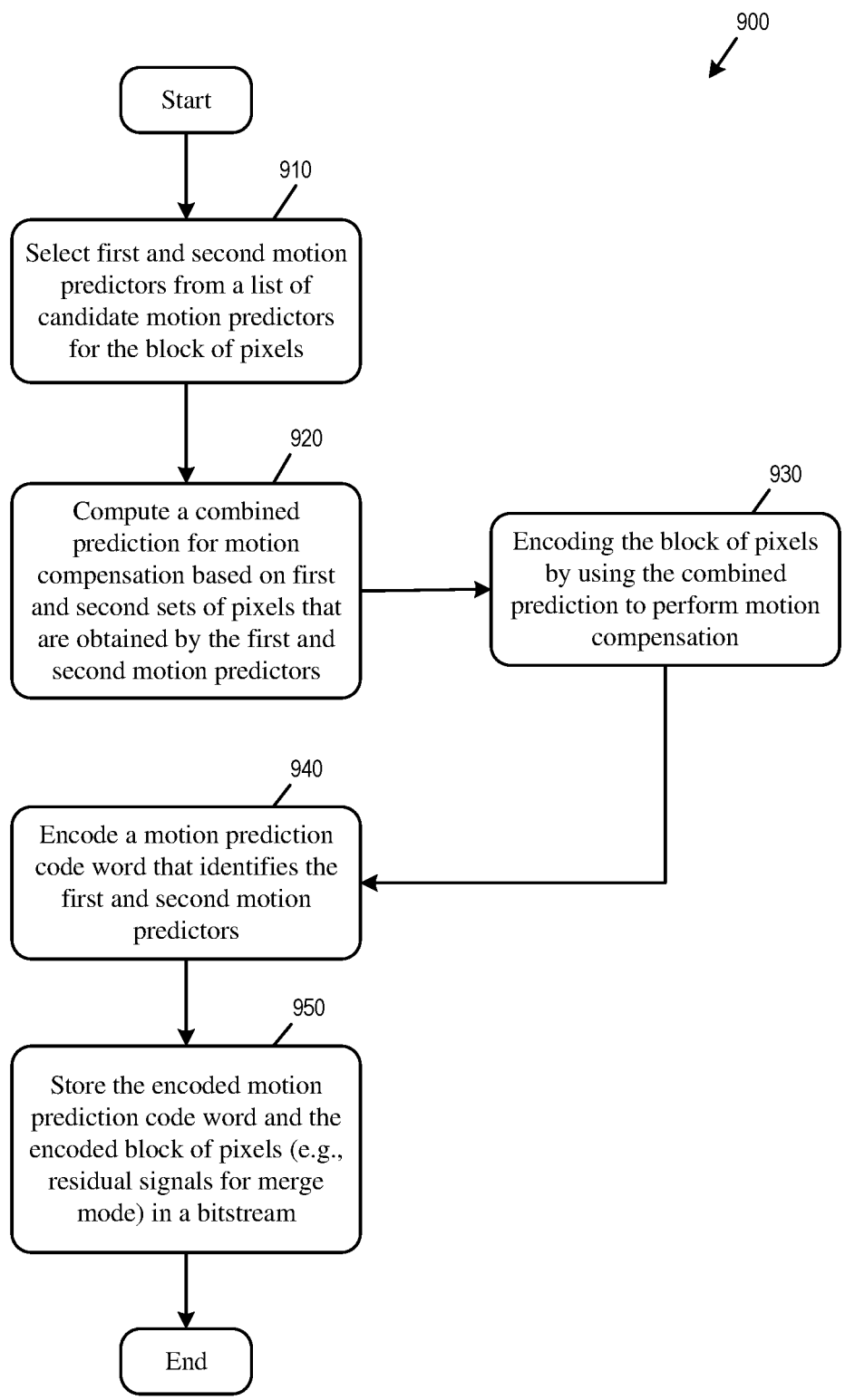
FIG. 9 conceptually illustrates a process for encoding a block of pixels by using multi-hypotheses motion prediction.

FIG. 9 conceptually illustrates a process 900 for encoding a block of pixels by using multi-hypotheses motion prediction. In some embodiments, the video encoder 700 performs the process 900 when encoding a block of pixels in a video picture or frame. In some embodiments, one or more processing units (e.g., a processor) of a computing device implementing the video encoder 700 performs the process 900 by executing instructions stored in a computer readable medium.

The video encoder starts the process 900 when it receives pixels the current block and decides to encode the current block by using multi-hypotheses skip or merge mode.

The video encoder selects (at step 910) first and second motion predictors from a list of candidate motion predictors for the block of pixels. In some embodiments, the video encoder selects the first candidate. The video encoder then selects the second candidate by applying an offset to the index of the first candidate, or by searching the list of candidates may be based on a difference with the first candidate. The selection of the first and second motion predictors is described in Section II above.

The video encoder computes (at step 920) a combined prediction for motion compensation based on first and second sets of pixels (first and second predictions) that are obtained by the selected first and second motion predictors, respectively. The video encoder may assign a weight to each set of pixels when combining them as weighted average to produce the combined prediction for motion compensation. The assignment of weight to each set of pixels (prediction) when computing the combined prediction for motion compensation is described in Section II above.

The video encoder encodes (at step 930) the block of pixels by using the combined prediction to perform motion compensation.

The video encoder encodes (at step 940) a motion prediction code word that identifies the selected first and second motion predictors. The motion prediction code word may explicitly encode multiple candidate selections. The motion prediction code word may also explicitly encode only the selection of the first candidate while letting the selection of the second candidate be implicitly conveyed (relying on the corresponding decoder to perform the same candidate selection process).

At step 950, the video encoder stores the encoded code word and the encoded block of pixels in a bitstream. The process 900 then ends.

IV. Multi-Hypotheses Video Decoder

Some embodiments of the disclosure provide a video decoder that implements multi-hypotheses motion prediction (skip/merge mode), which allows the decoder to receive motion prediction based on a selection of multiple motion predictors from a list of candidate motion predictors. The video decoder receives a bitstream that includes an encoded block of pixels and a motion prediction code word for the encoded block of pixels. The video decoder selects a first motion predictor and a second motion predictor from a list of candidate motion predictors based on the motion prediction code word. The video decoder computes a combined prediction based on first and second sets of pixels that are obtained using the first and second motion predictors, respectively. The video decoder decodes the block of pixels by using the combined prediction for motion compensation. The video decoder may output the decoded block of pixels.

Figure 10:
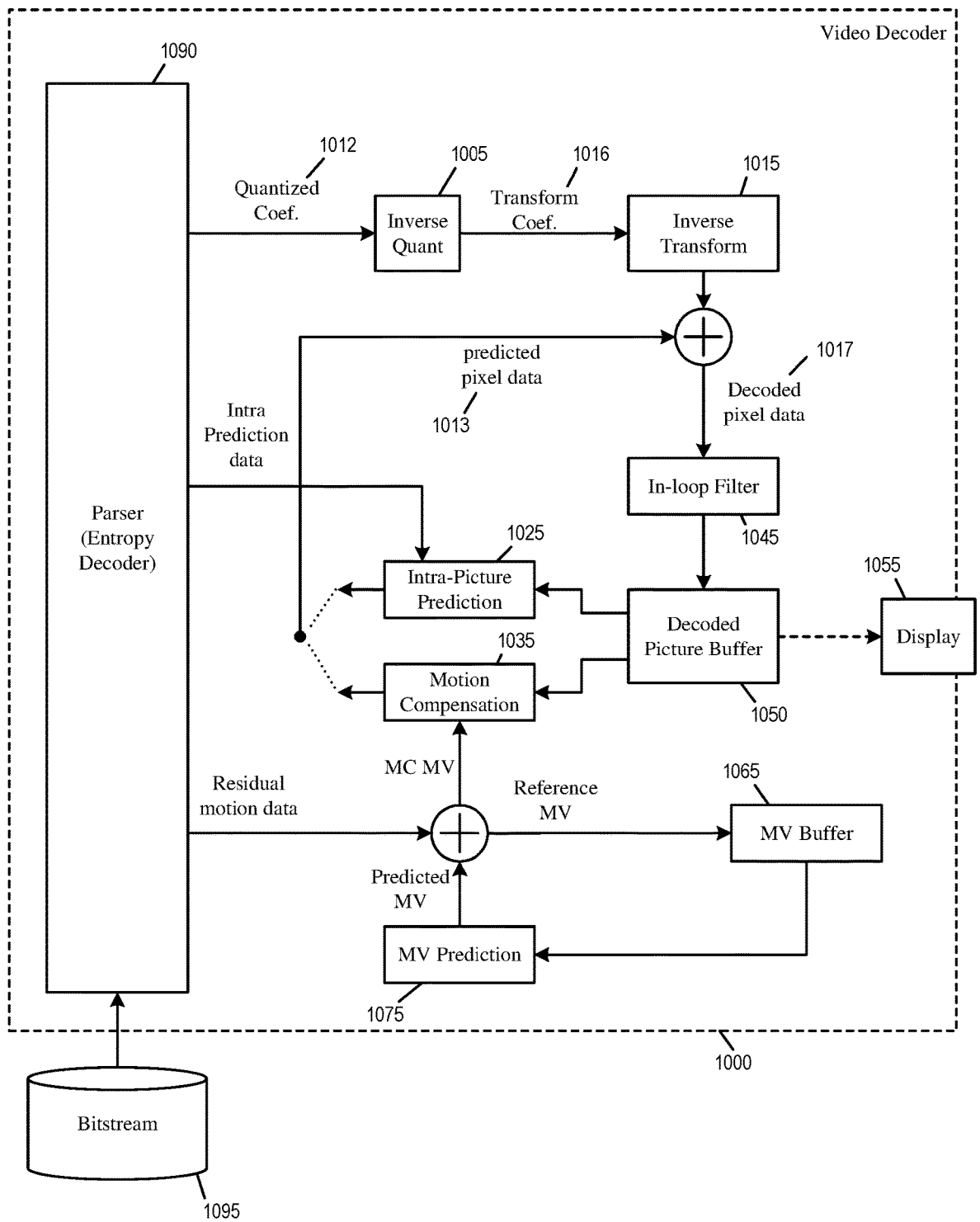
FIG. 10 illustrates an example video decoder that implements multi-hypotheses motion prediction.

FIG. 10 illustrates an example video decoder 1000 that implements multi-hypotheses motion prediction. As illustrated, the video decoder 1000 is an image-decoding or video-decoding circuit that receives a bitstream 1095 and decodes the content of the bitstream into pixel data of video frames for display. The video decoder 1000 has several components or modules for decoding the bitstream 1095, including an inverse quantization module 1005, an inverse transform module 1015, an intra-picture prediction module 1025, a motion compensation module 1035, an in-loop filter 1045, a decoded picture buffer 1050, a MV buffer 1065, a MV prediction module 1075, and a bitstream parser 1090.

In some embodiments, the modules 1010-1090 are modules of software instructions being executed by one or more processing units (e.g., a processor) of a computing device. In some embodiments, the modules 1010-1090 are modules of hardware circuits implemented by one or more ICs of an electronic apparatus. Though the modules 1010-1090 are illustrated as being separate modules, some of the modules can be combined into a single module.

The parser 1090 (or entropy decoder) receives the bitstream 1095 and performs initial parsing according to the syntax defined by a video-coding or image-coding standard. The parsed syntax element includes various header elements, flags, as well as quantized data (or quantized coefficients) 1012. The parser 1090 parses out the various syntax elements by using entropy-coding techniques such as context-adaptive binary arithmetic coding (CABAC) or Huffman encoding.

The inverse quantization module 1005 de-quantizes the quantized data (or quantized coefficients) 1012 to obtain transform coefficients, and the inverse transform module 1015 performs inverse transform on the transform coefficients 1016 to produce decoded pixel data 1017 (after adding prediction pixel data 1013 from the intra-prediction module 1025 or the motion compensation module 1035). The decoded pixels data are filtered by the in-loop filter 1045 and stored in the decoded picture buffer 1050. In some embodiments, the decoded picture buffer 1050 is a storage external to the video decoder 1000. In some embodiments, the decoded picture buffer 1050 is a storage internal to the video decoder 1000.

The intra-picture prediction module 1025 receives intra-prediction data from bitstream 1095 and according to which, produces the predicted pixel data 1013 from the decoded pixel data 1017 stored in the decoded picture buffer 1050. In some embodiments, the decoded pixel data 1017 is also stored in a line buffer (not illustrated) for intra-picture prediction and spatial MV prediction.

In some embodiments, the content of the decoded picture buffer 1050 is used for display. A display device 1055 either retrieves the content of the decoded picture buffer 1050 for display directly, or retrieves the content of the decoded picture buffer to a display buffer. In some embodiments, the display device receives pixel values from the decoded picture buffer 1050 through a pixel transport.

The motion compensation module 1035 produces predicted pixel data 1013 from the decoded pixel data 1017 stored in the decoded picture buffer 1050 according to motion compensation MVs (MC MVs). The motion compensation module 1035 will be further described by reference to FIG. 11 below with regard to multi-hypotheses motion prediction. These motion compensation MVs are decoded by adding the residual motion data received from the bitstream 1095 with predicted MVs received from the MV prediction module 1075.

The MV prediction module 1075 generates the predicted MVs based on reference MVs that were generated for decoding previous video frames, e.g., the motion compensation MVs that were used to perform motion compensation. The MV prediction module 1075 retrieves the reference MVs of previous video frames from the MV buffer 1065. The video decoder 1000 stores the motion compensation MVs generated for decoding the current video frame in the MV buffer 1065 as reference MVs for producing predicted MVs.

The in-loop filter 1045 performs filtering or smoothing operations on the decoded pixel data 1017 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 11:
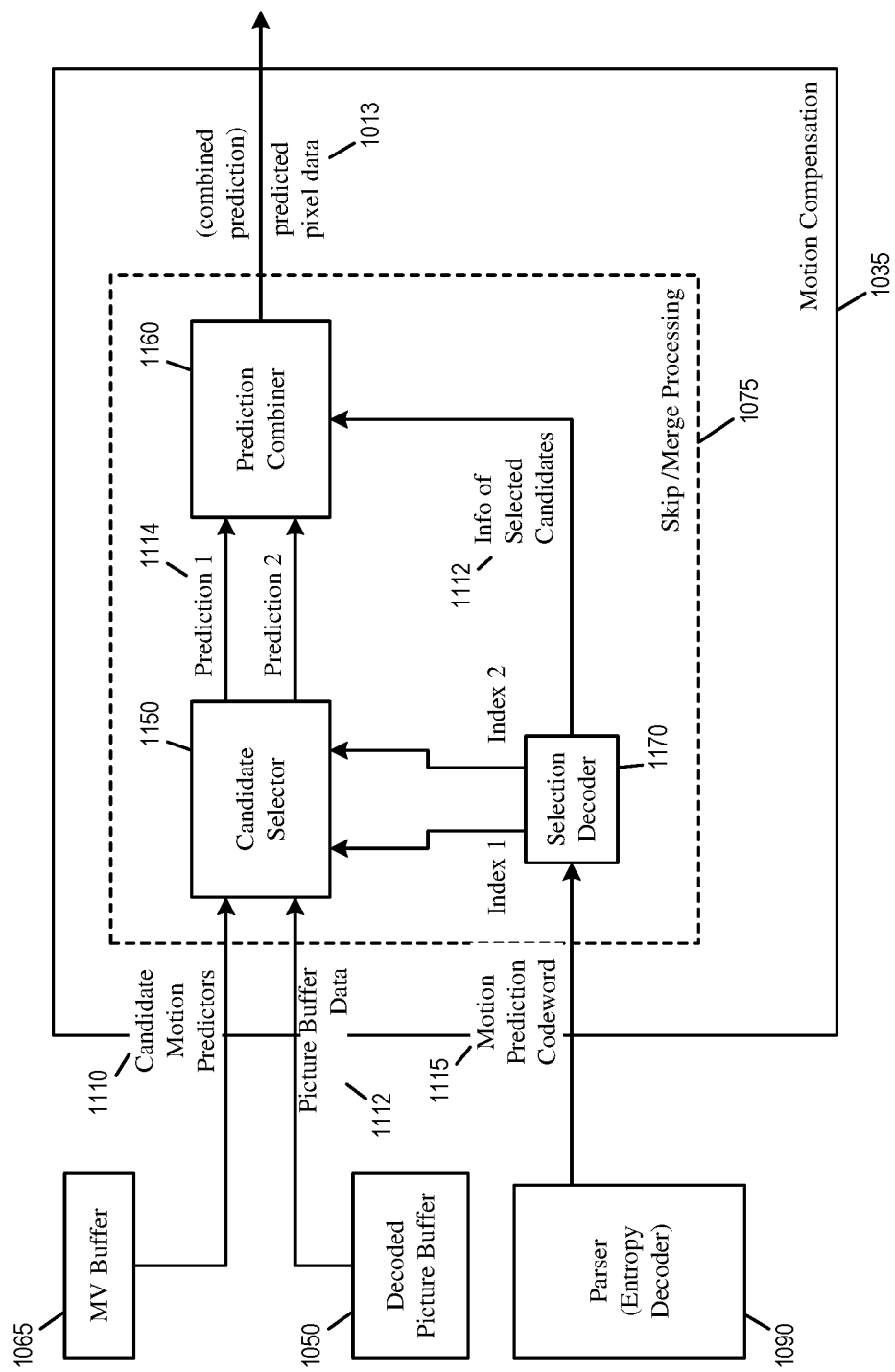
FIG. 11 illustrates a motion compensation module implementing multi-hypotheses motion prediction in the video decoder.

FIG. 11 illustrates the motion compensation module 1035 implementing multi-hypotheses motion prediction in the video decoder 1000. As illustrated, the motion compensation module 1035 receives previously stored motion vectors from the MV buffer 1065 as candidate motion predictors 1110. The motion compensation module 1035 also receives a motion prediction code word 1115 from the bitstream 1095 (parsed out by the parser 1090). Based on the received motion prediction code word 1115 and the received candidate motion predictors 1110, the motion compensation module 1035 generates the predicted pixel data 1013.

The motion compensation module 1035 includes a candidate selector module 1150, a prediction combiner module 1160, and a selection decoder module 1170.

The selection decoder module 1170 decodes the motion prediction code word 1115, which provides identities (or indices) of the one or two motion candidates that were selected and used to encode the current block. A motion prediction code word may explicitly encode the selection of multiple motion predictors. A motion prediction code word may also explicitly encode only the selection of the first motion candidate while letting the selection of the second motion candidate be implicitly conveyed (by e.g., applying an offset to the index of the first motion candidate or searching the list of motion candidates based on a difference with the first motion candidate). The encoding of the code word 1115 is described in Section II above.

In some embodiments, the selection decoder module 1170 determines the implicit identity of the second selected motion candidate based on picture buffer data 1112. For each of candidate motion predictors 1110, the picture buffer data 1112 provide information that allows the selection decoder module 1170 to determine: the spatial location of the neighboring block from which the candidate motion predictor is adopted; the pixels targeted or referenced by the candidate motion predictor (e.g., according to the predetermined template); the motion vector type (e.g., bi-prediction, uni-prediction); and other types of information.

Based on this information, the selection decoder module 1170 may select the second candidate from the list of motion candidates. The selection decoder 1170 may search the candidates list for the second motion candidate based on the candidate information 1112. The selection decoder 1170 may also select the second motion candidate based on index offset from the first selected motion candidate. The selection of the first and second candidates is described in Section II above.

The identities of the selected motion candidates are provided to the candidate selector module 1150, which receives the candidate motion predictors 1110 (i.e., the stored motion vectors retrieved from the MV buffer 1065) and uses the identities of the selected motion candidates to select one or two candidate motion predictors 1114 from the candidate motion predictors 1110. The selected candidate motion predictors are used to obtain predictions 1114 for motion compensation: prediction 1 corresponds to a first set of pixels that are obtained using the first selected motion predictor and prediction 2 corresponds to a second set of pixels that are obtained using the second selected motion predictor. The predictions 1114 for motion compensation are forwarded to the prediction combiner 1160, which combines the obtained predictions 1114 into a combined prediction for motion compensation, which is used as the predicted pixel data 1013.

The prediction combiner module 1160 combines the two predictions 1114 (which are pixel data obtained based on the two selected motion predictors) into the combined prediction 1013. The combination may be simple average or weighted sum of the predictions 1114. The prediction combiner 1160 may also use information derived from picture buffer data 1112 to assign a weight to each of the predictions 1114. The assignment of weight to each prediction when computing the combined prediction 1013 for motion compensation is described in Section II.

In some embodiments, the two predictions 1114 (predictions 1 and 2) are applied separately to different first and second spatial regions within the current block. In such instances, the prediction combiner module 1160 would apply the first prediction (prediction 1 derived from the first selected motion predictor) when the first region of the current block is being decoded and apply the second prediction (prediction 2 derived from the second selected motion predictor) when the second region of the current block is being decoded. If the two regions overlap, the prediction combiner 1160 calculates a combined prediction as a weighted average of the two predictions 1114. The weight assigned to each prediction is based on information derived from picture buffer data 1112, e.g., pixel distances between the current block and the spatial neighboring blocks of the two selected motion candidates.

Figure 12:
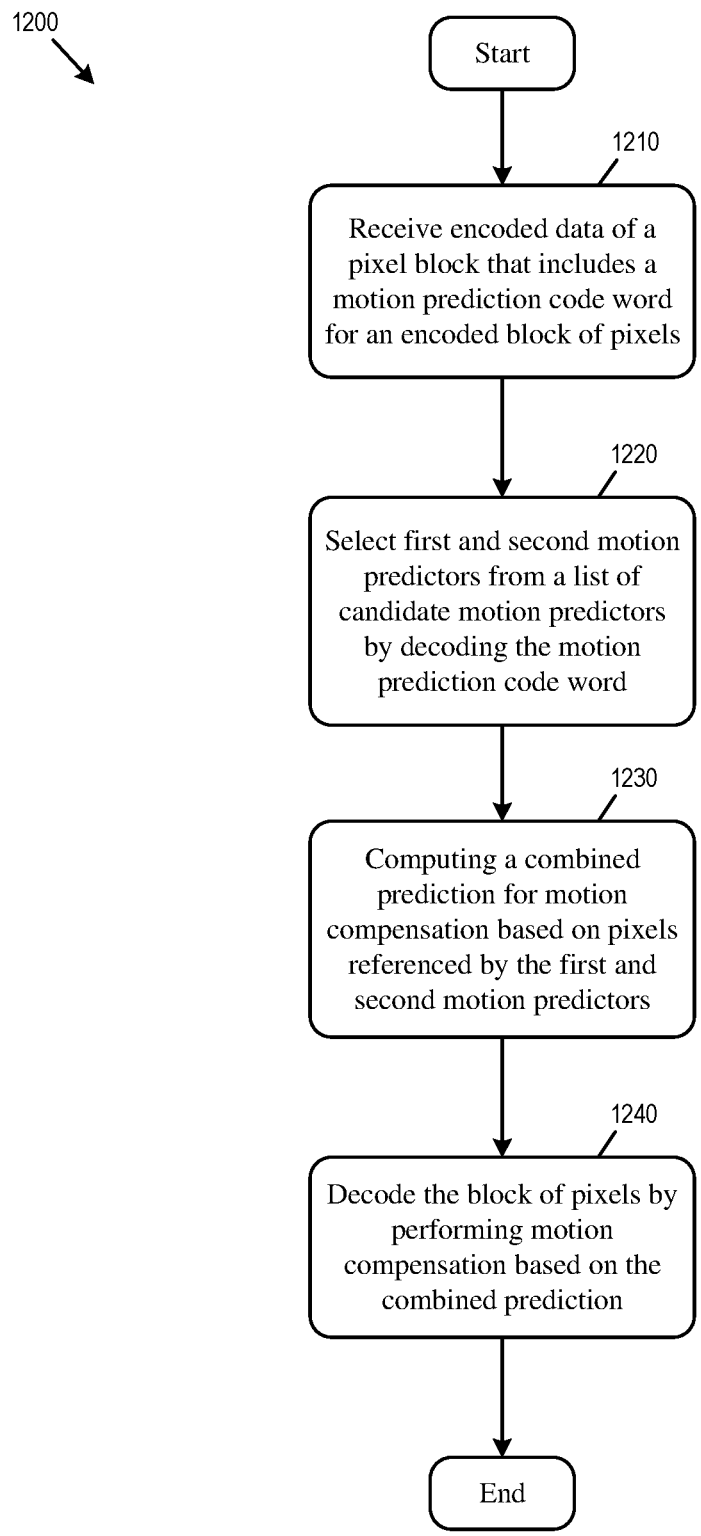
FIG. 12 conceptually illustrates a process for decoding a block of pixels by using multi-hypotheses motion prediction.

FIG. 12 conceptually illustrates a process 1200 for decoding a block of pixels by using multi-hypotheses motion prediction. In some embodiments, the video decoder 1000 performs the process 1200 when decoding a block of pixels in a video picture or frame. In some embodiments, one or more processing units (e.g., a processor) of a computing device implementing the video decoder 1000 performs the process 1200 by executing instructions stored in a computer readable medium.

The video decoder receives (at step 1210) encoded data of a pixel block. The encoded data includes a motion prediction code word for the encoded block of pixels. The encoded data may also include transform data of residual signal for the block of pixels.

The video decoder selects (at step 1220) first and second motion predictors from a list of candidate motion predictors by decoding the motion prediction code word. The motion prediction code word may explicitly encode only the selection of the first motion candidate while letting the selection of the second motion candidate be implicitly conveyed (by e.g., applying an offset to the index of the first motion candidate or searching the list of motion candidates based on the first motion candidate).

The video decoder computes (at step 1230) a combined prediction for motion compensation based on first and second sets of pixels (first and second predictions) that are obtained by the selected first and second motion predictors, respectively. The video decoder may assign a weight to each set of pixels when combining them as weighted average to produce the combined prediction for motion compensation. The assignment of weight to each set of pixels (prediction) when computing the combined prediction for motion compensation is described in Section II above.

At step 1250, the video decoder decodes or reconstructs the pixels of the block by performing motion compensation based on the combined prediction. The process 1200 then ends.

V. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 13:
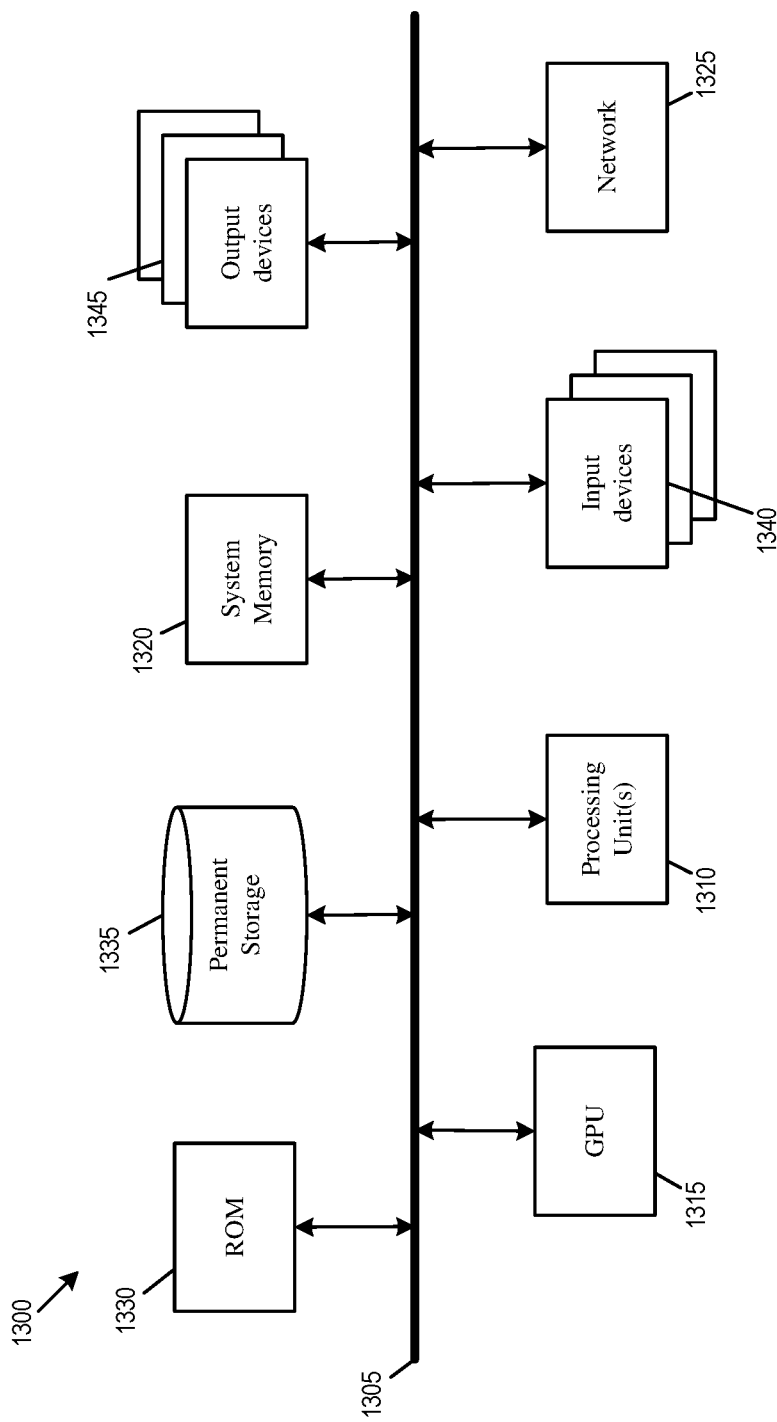
FIG. 13 conceptually illustrates an electronic system with which some embodiments of the present disclosure are implemented.

FIG. 13 conceptually illustrates an electronic system 1300 with which some embodiments of the present disclosure are implemented. The electronic system 1300 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1300 includes a bus 1305, processing unit(s) 1310, a graphics-processing unit (GPU) 1315, a system memory 1320, a network 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the GPU 1315, the read-only memory 1330, the system memory 1320, and the permanent storage device 1335.

From these various memory units, the processing unit(s) 1310 retrieves instructions to execute and data to process in order to execute the processes of the present disclosure. The processing unit(s) may be a single processor or a multi-core processor in different embodiments. Some instructions are passed to and executed by the GPU 1315. The GPU 1315 can offload various computations or complement the image processing provided by the processing unit(s) 1310.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the present disclosure use a mass-storage device (such as a magnetic or optical disk and its corresponding disk drive) as the permanent storage device 1335.

Other embodiments use a removable storage device (such as a floppy disk, flash memory device, etc., and its corresponding disk drive) as the permanent storage device. Like the permanent storage device 1335, the system memory 1320 is a read-and-write memory device. However, unlike storage device 1335, the system memory 1320 is a volatile read-and-write memory, such a random-access memory. The system memory 1320 stores some of the instructions and data that the processor needs at runtime. In some embodiments, processes in accordance with the present disclosure are stored in the system memory 1320, the permanent storage device 1335, and/or the read-only memory 1330. For example, the various memory units include instructions for processing multimedia clips in accordance with some embodiments. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 6, 9, 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method comprising:
   selecting a first motion predictor and a second motion predictor from a list of candidate motion predictors for a block of pixels;
   coding a motion prediction code word that identifies the first and second motion predictors;
   generating a first set of predicted pixels that corresponds to a first spatial region within the block according to the first motion predictor;
   generating a second set of predicted pixels that corresponds to a second spatial region within the block different from the first spatial region according to the second motion predictor;
   computing a combined prediction based on the first set of predicted pixels and the second set of predicted pixels; and
   coding the block of pixels according to the combined prediction for motion compensation.

2. The method of claim 1, wherein the list of candidate motion predictors is a set of merge candidates for merge mode.

3. The method of claim 1, wherein the code word for identifying the first and second motion predictors comprises a first index identifying the first motion predictor and a second index identifying the second motion predictor from the list of candidate motion predictors.

4. The method of claim 3, wherein the second index is coded as a difference from the first index in the code word.

5. The method of claim 1, wherein the code word for identifying the first and second motion predictors comprises a particular index that identifies (i) any one candidate motion predictors from the list of candidate motion predictors or (ii) a combination of any two candidate motion predictors from the list of candidate motion vectors.

6. The method of claim 1, wherein the code word for identifying the first and second motion predictors comprises a particular index that identifies the first motion predictor, wherein the second motion predictor is identified according to an offset from the particular index.

7. The method of claim 1, wherein the code word for identifying the first and second motion predictors comprises a particular index that identifies the first motion predictor, wherein the second motion predictor is identified according to a predetermined searching process.

8. The method of claim 7, wherein the second motion predictor is identified based on a difference between a template of the second motion predictor and a template of the first motion predictor.

9. The method of claim 1, wherein the combined prediction includes an overlapped region where the first and second spatial regions overlap, and the overlapped region is an average of a corresponding portion of the first set of predicted pixels and a corresponding portion of the second set of predicted pixels.

10. The method of claim 1, wherein
    the combined prediction includes an overlapped region where the first and second spatial regions overlap,
    the overlapped region is a weighted average of a corresponding portion of the first set of predicted pixels and a corresponding portion of the second set of predicted pixels, and
    the weighted average favors a motion predictor having a smaller difference between the block of pixels being encoded and a set of pixels obtained by the motion predictor.

11. The method of claim 1, wherein selecting the first and second motion predictors from the list of candidate motion predictors comprises selecting the first and second motion predictors from a subset of the list of candidate motion predictors.

12. An electronic apparatus comprising:
    processing circuitry configured to:
      receive a bitstream comprising encoded data for a block of pixels and a motion prediction code word for the block of pixels;
      select a first motion predictor and a second motion predictor from a list of candidate motion predictors based on the motion prediction code word;
      generate a first set of predicted pixels that corresponds to a first spatial region within the block according to the first motion predictor;

generate a second set of predicted pixels that corresponds to a second spatial region within the block different from the first spatial region according to the second motion predictor;

compute a combined prediction based on the first set of predicted pixels and the second set of predicted pixels;

decode the encoded data for the block of pixels to obtain a decoded block of pixels according to the combined prediction for motion compensation; and output the decoded block of pixels for display.

13. The electronic apparatus of claim 12, wherein the processing circuitry is further configured to:

use the first motion predictor to perform first motion compensation prediction for the first spatial region; and use the second motion predictor to perform second motion compensation prediction for the second spatial region.

14. An electronic apparatus comprising:

processing circuitry configured to:

select a first motion predictor and a second motion predictor from a list of candidate motion predictors for a block of pixels;

encode a motion prediction code word that identifies the first and second motion predictors;

generate a first set of predicted pixels that corresponds to a first spatial region within the block according to the first motion predictor;

generate a second set of predicted pixels that corresponds to a second spatial region within the block different from the first spatial region according to the second motion predictor;

compute a combined prediction based on the first set of predicted pixels and the second set of predicted pixels;

encode the block of pixels to obtain encoded data for the block of pixels by using the combined prediction for motion compensation; and store the motion prediction code word and the encoded data in a bitstream.

15. The method of claim 1, wherein the computing of the combined prediction comprises applying the first motion predictor and the second motion predictor separately to first and second spatial regions within the block of pixels such that the first motion predictor is applied when the first spatial region is being decoded and the second motion predictor is applied when the second spatial region is being decoded.

16. The method of claim 15, wherein the first and second spatial regions overlap, and wherein the computing of the combined prediction comprises calculating the combined prediction as a weighted average of the first motion predictor and the second motion predictor.

17. The method of claim 16, wherein the weighted average of the first motion predictor and the second motion predictor is based on information derived from pixel distances between the block of pixels and spatial neighboring blocks.

18. The method of claim 1, wherein the combined prediction includes an overlapped region where the first and second spatial regions overlap, the overlapped region is a weighted average of a corresponding portion of the first set of predicted pixels and a corresponding portion of the second set of predicted pixels, the first set of predicted pixels and the second set of predicted pixels are generated according to respective reference blocks, and the weightings for determining the weighted average is assigned according to spatial distances between the block of pixels and the reference blocks.

* * * * *